United States Patent
Kraus et al.

(10) Patent No.: US 9,739,353 B2
(45) Date of Patent: Aug. 22, 2017

(54) ACTIVE BEARING

(71) Applicant: Fraunhofer-Gesellschaft zur Förderung der angewandten Forschung e.V., Munich (DE)

(72) Inventors: Roman Kraus, Karben (DE); Timo Jungblut, Darmstadt (DE); Sven Herold, Gross-Umstadt (DE); Tobias Melz, Darmstadt (DE)

(73) Assignees: FRAUNHOFER-GESELLSCHAFT ZUR FOERDERUNG DER ANGEWANDTEN FORSCHUNG E.V., Munich (DE); TU DARMSTADT, Darmstadt (DE)

(*) Notice: Subject to any disclaimer, the term of this patent is extended or adjusted under 35 U.S.C. 154(b) by 166 days.

(21) Appl. No.: 13/737,000

(22) Filed: Jan. 9, 2013

(65) Prior Publication Data
US 2013/0180350 A1    Jul. 18, 2013

(30) Foreign Application Priority Data

Jan. 16, 2012  (EP) .................................... 12000216

(51) Int. Cl.
*F16F 15/00* (2006.01)
*F16H 21/44* (2006.01)
*F16F 13/26* (2006.01)

(52) U.S. Cl.
CPC ........... *F16H 21/44* (2013.01); *F16F 13/264* (2013.01); *F16F 15/005* (2013.01); *Y10T 74/1892* (2015.01); *Y10T 74/18968* (2015.01)

(58) Field of Classification Search
CPC ........ F16F 13/264; F16F 15/005; F16F 15/00; F16F 15/046; F16F 13/06; F16F 13/24;
(Continued)

(56) References Cited

U.S. PATENT DOCUMENTS 4,600,863 A * 7/1986 Chaplin et al. ................ 318/114
4,869,474 A * 9/1989 Best .................... B60G 17/0195
                                                                180/300
(Continued)

FOREIGN PATENT DOCUMENTS

DE     196 17 840 A1    11/1997
DE      41 16 270 A1     7/1999
(Continued)

*Primary Examiner* — Anna Momper
(74) *Attorney, Agent, or Firm* — Fitch, Even, Tabin & Flannery LLP

(57) ABSTRACT

An active bearing at least for vibration reduction is described, comprising
a) an interface (7) to be fitted to a load (8);
b) at least one support element (3) in an operative connection with the interface (7) and a support unit (6);
c) at least one linear actuator (5) supported indirectly or directly on the support unit (6);
d) a gear unit (4) for the path transmission of an actuating path change originating from the linear actuator (5), said gear unit being in an operative connection with the at least one linear reactor (5);
e) at least one decoupling unit (1), which serves for the decoupling of the static load transfer and for transmitting the dynamic load transfer; wherein the at least one linear actuator (5), the gear unit (4) and the at least one decoupling unit (1) are disposed serially.

41 Claims, 5 Drawing Sheets

(58) Field of Classification Search
CPC .......... F16F 13/22; F16F 13/04; F16F 13/005; F16F 13/007; F16H 21/44; Y10T 74/1892; Y10T 74/18968
See application file for complete search history.

(56) References Cited

U.S. PATENT DOCUMENTS

| | | | | |
|---|---|---|---|---|
| 5,927,699 | A * | 7/1999 | Nakajima | B60K 5/1283 267/140.13 |
| 6,378,852 | B1 * | 4/2002 | Ticks et al. | 267/140.14 |
| 2009/0102105 | A1 * | 4/2009 | Hasegawa et al. | 267/122 |
| 2009/0121398 | A1 * | 5/2009 | Inoue | 267/140.14 |
| 2011/0042872 | A1 * | 2/2011 | Hasegawa et al. | 267/140.14 |

FOREIGN PATENT DOCUMENTS

| | | | |
|---|---|---|---|
| DE | 10207862 C1 * | 7/2003 | ............ F16F 1/3615 |
| DE | 10 2008 055 535 A1 | 7/2010 | |
| EP | 2 253 863 A2 | 11/2010 | |

* cited by examiner

ACTIVE BEARING

CROSS REFERENCE TO RELATED APPLICATION

Reference is made to Patent Application EP 12 000 216.7, filed on Jan. 16, 2012, which application is incorporated herein by reference in its entirety.

BACKGROUND OF THE INVENTION

Field of the Invention

The invention relates to an active bearing for the controlled vibration transmission between a vibrating load and a support unit. The active bearing chiefly serves for the vibration reduction, that is the vibration damping and/or vibration decoupling and/or for the vibration compensation of the vibrating load with respect to the support unit. The active bearing is also capable of influencing the vibration state of the vibrating load.

For this purpose, the active bearing comprises an interface to be fitted to the load to be borne with the attributable static and dynamic load transfer acting on the bearing via the interface. To support the static load transfer, typically caused by the weight force of the load, at least one support element in an operative connection with the interface and the support unit is provided with the support element forming a first force path. Furthermore, there are provided at least one linear actuator supported indirectly or directly on the support unit, a gear unit for the path transmission of an actuating path change or an actuating path originating from the linear actuator. The gear unit is in an operative connection with the at least one linear actuator, as well as at least one decoupling unit, which serves for the decoupling of the static load transfer and for transmitting the dynamic load transfer and by means of which the gear unit is indirectly or directly in an operative connection with the interface. The at least one linear actuator, the gear unit and the at least one decoupling unit are disposed in a serial sequence and form a second force path, which is typically orientated parallel with the first force path, for the dynamic load transfer.

Description of the Prior Art

In numerous technical applications, mechanical structures are caused by machines to vibrate in an undesirable manner. In order to reduce the transfer of the exciting forces to the mechanical structures, the sources of interference, for example in the form of engines or other units, are mounted elastically in many cases. In order to avoid the vibration amplitudes acting on the elastic bearings becoming unacceptably great, such bearings have a sufficiently high damping capacity, which however can in turn have a negative effect on the capacity for vibration decoupling. This conflict exists in the case of elastic bearings ultimately leading to a compromise between the highest possible damping of vibrations in the low frequency range and the lowest possible damping vibrations in the higher frequency.

A known bearing topology solving the aforementioned bearing problem comprises a flexible element, for example in the form of a spring, introduced between a load and a support unit, parallel to which a series arrangement comprising a largely flexible as well as a largely damping element is incorporated. A technical embodiment of such a bearing topology is represented by a hydrobearing described in EP Patent 2 253 863 A2, which provides an interface serving for the load application and a support unit, which are both connected via an elastic support element and, together with a dividing wall, form the boundary of a working chamber filled with a fluid. By means of a damping channel provided inside the dividing wall, the working chamber is connected in a fluid-communicating manner to a compensating chamber, which together with the dividing wall is surrounded by an elastically flexible boundary wall.

Hydrobearings of this kind are used primarily in motor vehicles to damp or to insulate the vibrations occurring during operation. The elastic support element, which is made from a highly elastic rubber, provides for the acoustic insulation, whilst the damping is achieved by a resonance effect in the damping channel, which connects hydraulically the working chamber with the compensating chamber.

A further embodiment for an elastic bearing provides for the integration of at least one suitably controllable actuator, so that the disturbing vibrations transferred by the load onto the bearing are compensated for as completely as possible by counter-vibrations generated by the actuator and introduced into the bearing. The control signals required for the actuator control are determined from measured variables with the aid of a suitable control strategy. The sensors required for this can be located both in the bearing and also outside the bearing. Depending on the control strategy, use is made of force, path, speed or acceleration sensors, microphones or other techniques. A preferred control strategy for vibration decoupling or compensation provides for the targeted actuator-led introduction of counter-vibrations in respect of the disturbing vibrations acting at the load side on the bearing. In order to be able to embody the actuator required to this in the easiest, smallest and most cost-effective manner, the at least one actuator initiating the counter-vibrations should be decoupled from the static load transfer, which essentially is caused by the weight force of the load in question, so that only dynamic loads caused by the disturbing vibrations act on the at least one actuator.

An active bearing technically embodied in this way is described in DE 10 2008 055 535 A1. Here, it involves an active damping hydraulic bearing, preferably for use as an engine bearing for a motor vehicle, which comprises a working chamber which is connected via an annular channel to a compensating chamber. In order to damp low-frequency vibrations from the engine with respect to the bodywork to be relieved of vibrations, hydraulic fluid flows out of the working chamber via the annular channel into the compensating chamber and back. If, on the other hand, high-frequency vibrations are introduced into the engine bearing, the annular channel is closed dynamically. To insulate high-frequency disturbing vibrations between engine and bodywork, a membrane partially bounding the working chamber is deflected with the aid of an actuator, so that the volume of the working chamber is kept as constant as possible despite the effect of high-frequency vibrations into the engine bearing. A piezoelectric linear actuator is used to deflect the membrane with the small actuating paths of the linear actuator being converted with the aid of a path transmission mechanism into large actuating path changes of the membrane, so that the membrane can cover large paths and compensate for large volumes in the working chamber. Depending on the control of the linear actuator, compensation for disturbing vibrations acting on the active hydrobearing can thus be obtained.

A further damping arrangement is disclosed in publication DE 41 16 270 A1, which provides a support element, a path transmission mechanism, an actuator, an elastomer element and a damping unit along a single force path, comparable with an arrangement such as is described immediately above; the devices differ solely in the embodiment of the damping unit.

A decoupling arrangement in the form of a hydraulic motor bearing for use in the motor vehicle sector is described by publication DE 196 17 840 A1. Such engine bearings are referred to as hydrobearings and are characterized by two working chambers filled with hydraulic fluid, which are in an operative connection via a transfer channel. In addition to the generally known form, the bearing comprises a further chamber, which is filled with electro-rheological fluid (ERF). The viscosity of this fluid can be influenced by applying a voltage. By regulating the viscosity of the ERF, the dynamic properties of the bearing can be changed in a targeted manner and dependent on the given operational state. The use of ERF, however, enables only the change in the bearing properties, in particular the stiffness and the damping, but not the transfer of additional forces that counteract the disturbing vibrations.

SUMMARY OF THE INVENTION

The problem to be solved in the underlying the invention is to further develop an active bearing for the controlled vibration transmission, primarily for the purpose of a vibration reduction between a load causing disturbing vibrations and a support unit with an actuator decoupled from the static forces acting on the active bearing. The actuator is preferably in the form of a linear actuator combined with a gear unit enlarging the actuating path of the linear actuator, in such a way that the efficiency of the actuator is improved both in qualitative and quantitative terms. On the one hand, it is necessary to design the force, which is to be exerted via the actuator to actively counter the disturbing vibrations and which needs to be introduced into the bearing, as independently as possible from the frequency of the disturbing vibrations for a working range optimized for the given actuator. On the other hand, it is necessary to be able to counter the disturbing vibrations within an increased frequency range, in particular increased towards lower frequencies, in an effective manner with the aid of the actuator. The active bearing should have a structure that is as simple as possible.

Features developing the active bearing according to the invention in an advantageous way are explained in the text of the description, in particular by reference to the illustrated examples of embodiment.

The active bearing according to the invention, which serves at least for vibration reduction, that is for vibration damping and/or vibration decoupling and/or vibration compensation, comprises an interface for fitting to a load which is to be borne and is exposed to or generates disturbing vibrations, via which the interface a static and also dynamic load transfer caused by the load acts on the bearing. In order to support the static load transfer acting on the bearing, at least one support element, for example in the form of an elastic structure, is provided between the interface and the support unit, which has to be decoupled relative to the load transfer encumbered with disturbing vibrations. The support element represents a first force path connecting the interface and the support unit together. Furthermore, at least one linear actuator is provided, which is supported indirectly or directly on the support unit. A gear unit for increasing the actuating paths or actuating path changes brought about by actuator is connected to the at least one linear actuator. Furthermore, a decoupling unit is provided for decoupling the static load transfer and for transmitting the dynamic load transfer, via which decoupling unit the gear unit and therefore also the linear actuator are indirectly or directly in an operative connection with the interface. The at least one linear actuator, the gear unit and the at least one decoupling unit are disposed in a serial sequence and form a second force path, which is preferably orientated parallel with the first force path, for the dynamic load transfer. According to the invention, the active bearing providing the aforementioned components along the serial sequence comprises the at least one linear actuator, the gear unit and the at least one decoupling unit, at least one elastically deformable element being introduced along the second force path, and the at least one support element and the elastically deformable element are in each case constituted and disposed as separate units spatially separated from one another. The gear unit is constituted as a mechanical path transmission mechanism, which comprises at least one lever mechanism. In addition, the components of the active bearing contained along the two force paths are surrounded by a compressible medium.

In order to be able to provide for an effective decoupling of the linear actuator provided along the second force path from a load acting statically on the bearing, which typically originates from the weight force of a vibrating object connected to the active bearing via the interface, and at the same time to provide for, in wide ranges, a frequency-independent force application through the linear actuator along the second force path. The decoupling unit typically has a frequency-dependent dynamic stiffness and is connected according to the invention to at least one elastically deformable element in a serial force flow sequence, which has a largely frequency-independent dynamic stiffness, like the stiffness of a spring element. In a particularly advantageous way, the damping properties of the at least one decoupling element and of the at least one elastically deformable element are also selected such that the decoupling unit has a greater damping capacity than the elastically deformable element. As the further embodiments will show, making reference to the corresponding figures, the selection of the damping capacity of the decoupling unit decisively influences a lower limit frequency, from which, with increasing frequencies, an effective force application through the linear actuator along the second force path for the purpose of effective vibration reduction is possible. The damping capacity of the decoupling unit should preferably be selected as high as possible in order in this way to extend the effectiveness of the linear actuator into regions of lower frequencies.

As already mentioned, the decoupling unit has a dynamic stiffness, which is dependent on the frequency of the dynamic load transfer. The dynamic stiffness of the decoupling unit typically increases with increasing frequencies. In contrast, the elastically deformable element has a dynamic stiffness which, in contrast with the frequency dependence of the dynamic stiffness of the decoupling unit explained above, is largely frequency-independent. In other words, the dynamic stiffness of the elastically deformable element is smaller, that is very much smaller than the dynamic stiffness of the decoupling unit, at least at frequencies from a specific frequency.

As a result of the serial arrangement of the decoupling unit and of the elastically deformable element along the second force path, it can be explained for system-related reasons that the overall dynamic stiffness, which results at least from the serial combination of the deformable element and the decoupling unit, can never be greater than the stiffnesses of the individual components. The dynamic stiffness of the elastically deformable element thus limits the maximum overall dynamic stiffness of the ensemble disposed in series along the second force path, the ensemble comprising the at least one linear actuator, the gear unit, the at least one decoupling unit and the at least one elastically deformable element. In this way, the linear actuator is better protected, in comparison with known, comparable bearing systems, against large vibration amplitudes, especially in the region of high frequencies, on account of the limited dynamic stiffness due to the elastically deformable element.

The at least one decoupling unit disposed along the second force path and the at least one elastically deformable element are separate components, which have the different static and also dynamic properties described above and, through the serial interaction along the second force path, are able to decouple in particular the largely weight-related static loads in the linear actuator due to the load transfer. Moreover, the separate embodiment and arrangement of the decoupling unit and the at least one elastically deformable element along the second force path enables a clearly defined task division for the two components, as a result of which a pre-requisite is met for a systematic optimization of the bearing properties through the mutual adaptation of the damping and stiffness properties of the two elements concerned to respectively different vibration tasks or requirements. An optimized design of the overall "bearing" system is thus considerably simplified.

Also taking into account the aforementioned explanation, it is particularly advantageous to constitute the active bearing in such a way that the components along the first and second force path are constituted and disposed so as to be uninfluenced by one another as far as possible. That is with the exception of the common linkage points on the one hand at the interface and on the other hand at the support unit, there are no other force-transferring operative connections between the components along the two force paths. The components of the active bearing contained along the two force paths are advantageously surrounded by a compressible medium, preferably gas, preferably air. In particular, the decoupling unit along the second force path and the support element defining the first force path are each constituted as separate units and are disposed spatially apart from one another, so that no direct operative connection exists between the decoupling unit and the support element.

The separate embodiment and arrangement of the at least one support element in the first force path and of the at least one elastically deformable element along the second force path guarantee a clearly defined separation of task for the two components. As a result, a pre-requisite is met for a systematic optimization of the bearing properties through the mutual adaptation of the stiffness properties of the two elements to respectively different vibration tasks or requirements. An optimized design of the overall "bearing" system is thus considerably simplified.

The gear unit provided along the second force path is constituted as a mechanical path enlargement mechanism and thus comprises at least one lever mechanism which makes it possible to enlarge the only small actuating paths or actuating path changes of a linear actuator preferably constituted as a solid-state actuator, as for example in the form of a piezo-stack actuator or magneto- or electrostrictive actuator. Since the gear unit or path enlargement mechanism is in principle disposed along the force flow of the linear actuator, the strength requirements on the gear unit are also automatically reduced through the decoupling of the static load transfer along the second force path by means of the decoupling unit, as a result of which simple and low-cost gear units can be used. In addition, there is the fact that the requirements on the linear actuator are also reduced, since the latter experiences forces which are greater by the path transmission ratio than on the gear or path transmission input.

In a further variant of embodiment of the active bearing, which as a gear unit comprises a mechanical path transmission mechanism comprising at least one lever mechanism with either the entire lever mechanism or at least parts of the lever mechanism being elastically deformable. Since, as explained above, the path transmission mechanism is in principle always disposed in the force flow of the linear actuator and consequently along the second force path, an integrative design of the gear unit and of the at least one elastically deformable element is conceivable and producible. Similarly in the case of an integrative embodiment of the elastically deformable element and the gear unit, the static and dynamic properties of the elastically deformable element and the gear unit can, at least within certain limits, be selected and adjusted independently of one another.

In principle, the sequence of the serial arrangement of the at least one decoupling unit, the at least one elastically deformable element, the linear actuator and the gear unit can be selected arbitrarily along the second force path. A plurality of elastically deformable elements can also be disposed along the second force path, which moreover can differ in their particular embodiment. Preferred embodiments for the elastically deformable element are represented, for example, by spring elements, molded bodies made of elastomer material or a combination of at least one spring element and at least one molded body made of elastomer material. For example, an embodiment for the formation of an active bearing is conceivable wherein the linear actuator combined with a gear unit in the force flow of the second force path is in each case connected on both sides directly adjacent to an elastically deformable element. Such a division of the elastically deformable element into two individual bodies is advantageous in those cases in which the resonance frequency of the combination of gear unit and linear actuator lies in or near to the excited frequency range of the active bearing. Further embodiments in this regard are disclosed below in connection with the description of an example of embodiment in this regard.

A viscous fluid damper, which provides a linearly deflectable displacement body along the second force path inside a hydraulic fluid bath enclosed in a housing, is preferentially suitable for the formation of the at least one decoupling unit. In order to be able to adjust variably the damping behavior of such a fluid damper preferably also during the operation of the active bearing, the use of an electro-rheological or magneto-rheological hydraulic fluid, inside which the displacement body is mounted so as to be deflectable in a linear motion along the second force path, is suitable in a possible embodiment, wherein the decoupling unit comprises a unit generating electric or magnetic fields to influence the viscosity of the electro-rheological or magneto-rheological fluid in order to change the damping capacity. Units generating electric or magnetic fields in this regard are known to the person skilled in the art, so that a further description in this regard is not required.

Measures known per se, such as are known from the prior art, are required for the operation of the active bearing. Thus, a control unit needs to be provided, which picks up a signal which represents disturbing vibrations and which can be detected with at least one signal transmitter coupled indirectly or directly to the load and, after processing of the signal, generates control signals which control the at least one linear actuator in order to bring about a reduction in vibrations. In the case of the embodiment explained above with a damping capacity that is variably preselectable by means of the decoupling unit, there is integrated along the second force path at least one sensor which is connected to an evaluation and control unit, which on the basis of a target function generates a control signal for influencing the adjustable damping capacity. Such active bearings for vibration decoupling are typically incorporated between a vibrating load and a support unit. A preferred area of use of a bearing constituted according to the invention concerns the vibration reduction of an engine unit with respect to a bearing structure supporting the engine unit, such as for example the bodywork of a motor vehicle or a rail-bound vehicle, the airframe of an aircraft or the structure of a ship's hull. Conversely, the active bearing can also be used for the vibration reduction of at least one vibration-sensitive component or structure with respect to a vibrating carrying structure. This is for example the case with a laboratory or measurement bench which has to be decoupled from the vibrating floor in a vibration-free manner.

The active bearing can also be used for the targeted or controlled influencing of the vibratory state of the vibrating load, wherein the aforementioned control unit suitably controls the linear actuator on the basis of a corresponding target function. In this way, it is therefore possible for example to damp high-frequency vibration components and to leave low-frequency vibration components of the vibrating load unaffected. The active bearing can control the vibration transmission between the load and the support unit through the aforementioned additional possibility of actively influencing the vibratory state of the vibrating load. The possibilities for the controlled vibration transmission by means of the active bearing range from a complete vibration decoupling by means of the explained vibration compensation between the vibrating load and the support unit, up to a suitable vibration excitation of the load. The bearing function of vibration reduction in the sense of vibration damping and/or vibration decoupling and/or the vibration compensation of the vibrating load with respect to the support unit will be explained below by reference to specific examples of embodiment.

BRIEF DESCRIPTION OF THE DRAWINGS

The invention is described by way of example below without restriction of the general inventive with the aid of examples of embodiment making reference to the drawings. In the figures.

DETAILED DESCRIPTION OF THE INVENTION

Figure 1:
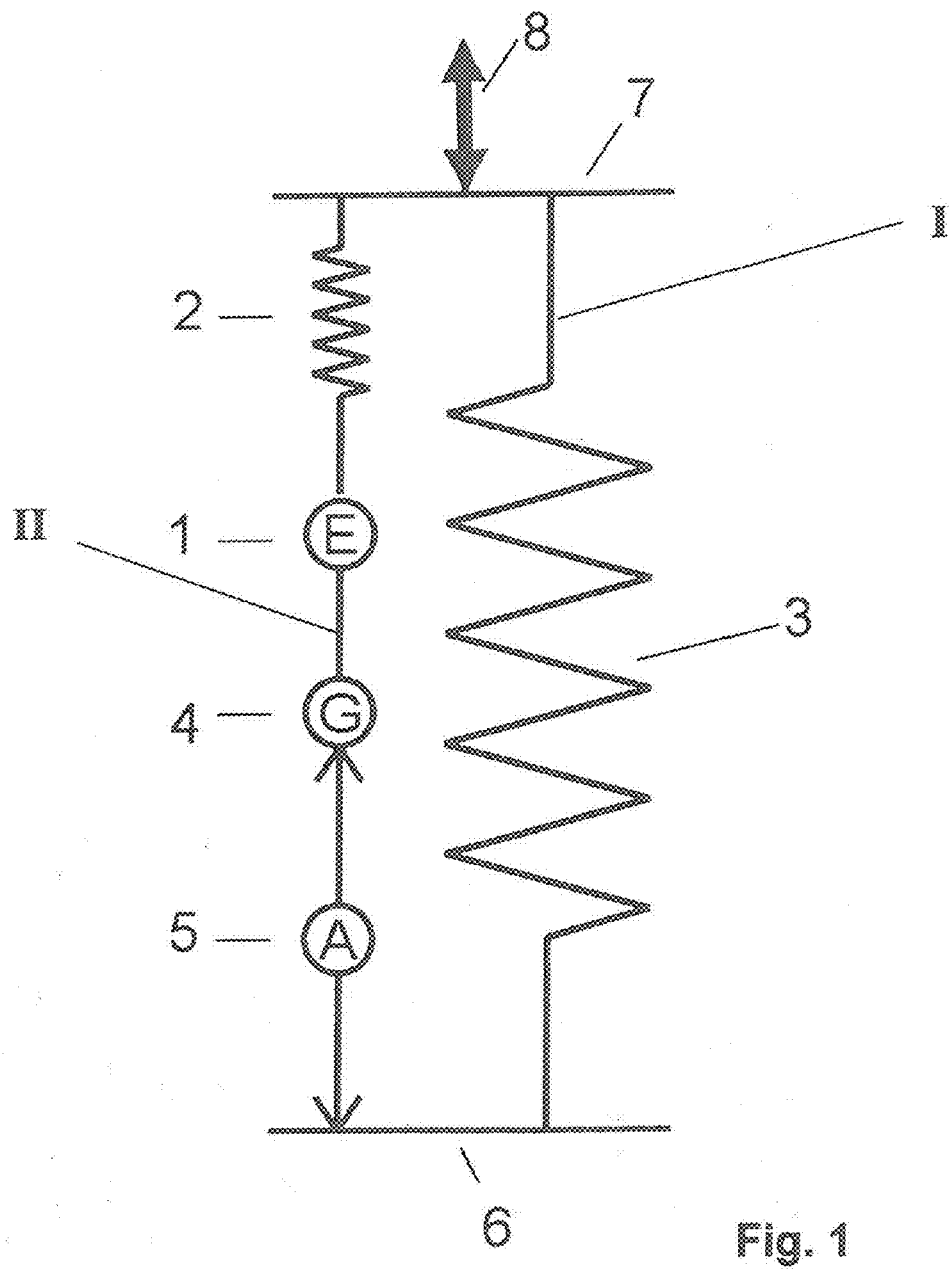
FIG. 1 shows a bearing topology of an active bearing according to the invention.

FIG. 1 illustrates, in a diagrammatic overview, a bearing topology of an active bearing according to the invention. A load 8 encumbered with disturbing vibrations acts at interface 7. The active bearing should be capable of decoupling, as completely as possible, the dynamic component of the load transfer with respect to a support unit 6.

For this purpose, the active bearing comprises at least two force paths preferably orientated parallel with one another which is a first force path I and a second force path II. Along first force path I, a support element 3 is connected both to interface 7 and also indirectly to support unit 6, which serves to take up the statically acting load component of load 8. The static load component typically originates as a result of the weight force of an object being borne at interface 7, or it may have other or further causes, such as for example driving torques inside a motor-driven vehicle. Support element 3, which typically comprises a suspension spring element or a plurality of suspension spring elements, is preferably produced from a material with a small damping capacity, so that the best possible insulation effect is enabled between vibrating load 8 and support unit 6 at high excitation frequencies.

A linear actuator 5, a gear unit 4, a decoupling unit 1 and an elastically deformable element 2 are disposed in a serial sequence between interface 7 and support unit 6 along second force path II. The serial arrangement of the four individual components 1, 2, 4, 5 provided along force path 2 can in principle be selected arbitrarily.

The ensemble comprising linear actuator 5, gear unit 4, decoupling unit 1 and elastically deformable element 2 disposed along second force path II is constituted and disposed, with the exception of the common link to interface 7 and to support unit 6, without further operative connection to the at least one support element 3 along first force path I. As the further examples of embodiment will show, components 1, 2, 4, 5 disposed along second force path II are disposed spatially separated with respect to support element 3 and preferably separated from one another by a compressible medium, such as air for example.

Many kinds of linear actuators 5 can in principle be used for the active countering of vibration of the dynamic load transfer via interface 7. Particularly well suited are solid-state actuators in the form of piezoactuators, also in the form of electro- and magneto-strictive actuators, for which the actuating paths or actuating path changes whereof are very small, so that such linear actuators for the actuating path enlargement are combined with a gear unit 4, preferably in the form of a mechanical path transmission mechanism. Decoupling unit 1 serves to decouple the static load transfer along second force path II, so that no or negligently small static load components possibly damaging or even destroying the linear actuator structure are able to act on linear actuator 5. Decoupling unit 1 also enables the transmission of dynamic load components, which are introduced both by load 8 and also by linear actuator 5 through corresponding control of the actuator for the purpose of vibration reduction via gear unit 4 by means of actuating path changes along second force path II. In a particularly advantageous way, decoupling unit 1 is constituted as an element having a damping effect, for example in the form of a viscous fluid damper.

Elastically deformable element 2, which has a spring-like effect along the second force path II, can, as a spring element, comprise a molded body made of an elastomer material or a combination of spring element and molded body. In contrast with a dynamic stiffness attributable to decoupling unit 1, which increases with increasing vibration frequencies, the dynamic stiffness behavior of elastically deformable element 2 is for the most part frequency-independent and smaller, for example very much smaller, than the dynamic stiffness of the decoupling unit which becomes greater with increasing frequencies, at least at frequencies from a specific frequency. Elastically deformable element 2 is thus also able to limit the maximum overall dynamic stiffness attributable to the component ensemble comprising elastically deformable element 2, decoupling unit 1, gear unit 4 and linear actuator 5.

A dynamic stiffness can also be attributable to the combination solely of linear actuator 5 and gear unit 4, with the dynamic stiffness also being greater than the dynamic stiffness attributable to the elastically deformable element. An ideally matched selection of the dynamic stiffnesses of individual components 1, 2, 4, 5 disposed along second force path II should be made in such a way that the overall dynamic stiffness of the component ensemble disposed along second force path II corresponds to the dynamic stiffness behavior represented in FIG. 2*a*.

Figure 2A:
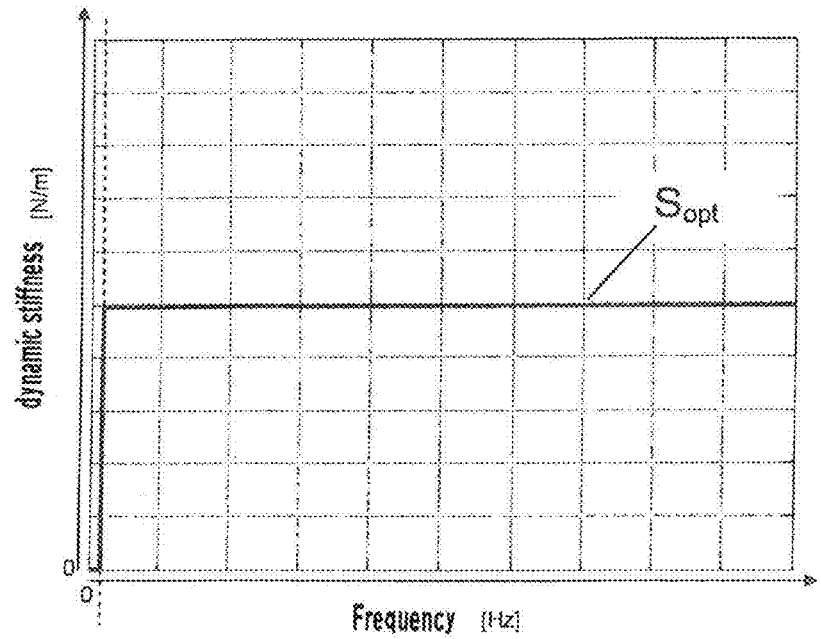
FIGS. 2a and b shows diagrammatic representations to explain by way of examples the force introduction capability of the active bearing according to the invention.

FIG. 2*a* shows a diagram, along the ordinate whereof values for the dynamic stiffness are plotted in units (N/m) and along the abscissa whereof frequency values are plotted in units (Hz).

The functional course represented in the diagram represents an ideal case for the dynamic stiffness property of the ideal component ensemble disposed along the second force path.

In the static region, that is at 0 Hz, no force whatsoever should be transmitted to linear actuator 5, so that in this region the static stiffness of the overall assembly amounts to 0. Above a limit frequency G dependent on the given case of application, the dynamic stiffness along second force path II should have a dynamic stiffness value $S_{opt}$ optimum for the introduction of actuator forces. The stiffness value has to be maintained as constant as possible over the entire remaining frequency range. Optimum stiffness $S_{opt}$, like limit frequency G, is also dependent on the intended use and the application-specific boundary conditions to which the active bearing is exposed.

Figure 2B:
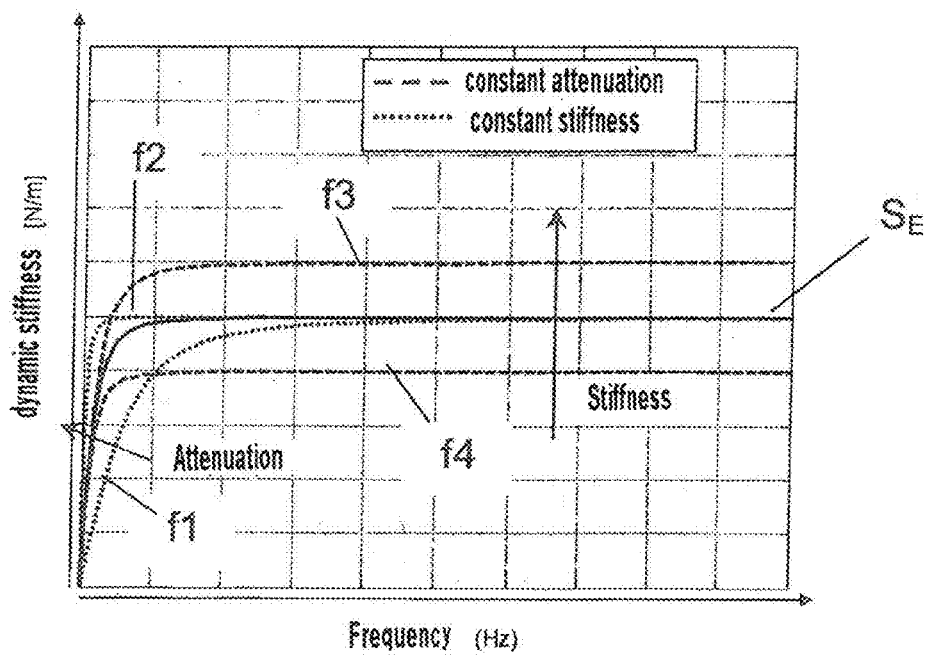

FIG. 2*b* shows, a diagram of the frequency-dependent dynamic stiffness of at least one combination of a decoupling unit 1 and an elastically deformable element 2 connected in series. In particular, it should be assumed in this case that decoupling unit 1 comprises an element with a damping effect, which on the one hand decouples the second force path and in particular linear actuator 5 from static loads and on the other hand, even with small disturbing frequencies, has a great dynamic stiffness compared to elastically deformable element 2.

In the static case, the overall stiffness of the component ensemble disposed along the second force path is ultimately given by the static stiffness of decoupling unit 1 with a damping effect, and is 0 in the ideal case, so that no force acts on linear actuator 5 along the second force path on account of decoupling unit 1. The dynamic stiffness of the component ensemble along the second force path is markedly influenced by the dynamic stiffness properties of elastically deformable element 2 and of decoupling unit 1. The higher the damping capacity of damping decoupling unit 1 is selected, the more rapidly the course of the dynamic stiffness converges with increasing frequency towards a final stiffness $S_E$, which in each case corresponds to the stiffness of the elastically deformable element.

In the case of curve f1 and f2 represented by dotted lines, the dynamic stiffness behavior of, in each case, a combination of a uniformly elastically deformable element with, in each case, differently damping decoupling units is represented. In the case of function f1, the damping capacity of the decoupling unit is selected to be smaller than in the case of function f2. In contrast, functions f3 and f4, represented by dashed lines, represent the dynamic stiffness behavior of a combination of, in each case, identical damping coupling units with elastically deformable elements selected differently in terms of stiffness. In the case of function f4, the stiffness of the elastically deformable element is smaller than in the case of function f3.

On the basis of the functions, it can clearly be seen that the selection of the damping capacity has a decisive influence on the position of limit frequency G, from which the linear actuator is capable of effectively introducing forces along the second force path. The selection of stiffness in respect of the elastically deformable element has only a subordinate influence on the position of limit frequency G. It is thus possible, through suitable damping selections, to introduce large forces through the linear actuator along the second force path even at low disturbing frequencies. Moreover, the dynamic stiffness is limited by the stiffness of elastically deformable element 2, which in wide ranges displays no dependence on the frequency.

Figure 3:
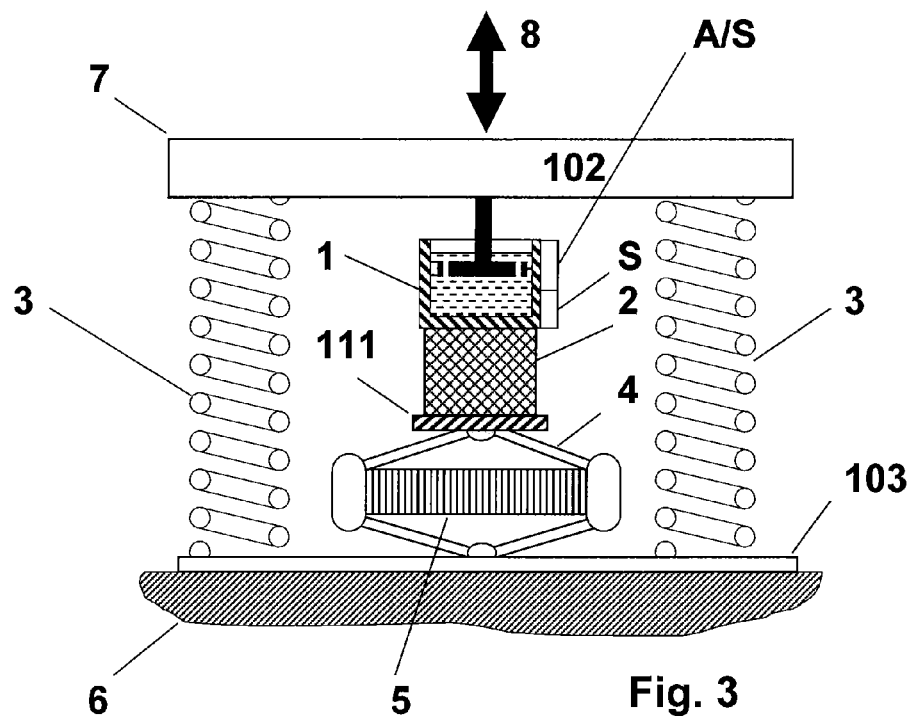
FIG. 3 shows a first variant of embodiment of an active bearing according to the invention.

FIG. 3 shows a possible embodiment of an active bearing constituted according to the invention. A load 8 acted on by disturbing vibrations can be borne via interface 7 with the smallest possible vibration transmission with respect to a support unit 6. For this purpose, interface 7 is in the form of a mounting plate 102, which on the load side comprises a mounting facility for affixing load 8. Provided between interface 7 in the form of a mounting plate 102 and a lower mounting plate 103, resting directly on support unit 6, are support elements 3 which are two or more suspension springs for supporting the load transfer acting in each case statically. The support elements are in the illustration as spiral springs being produced from metal, carbon or similar materials. Support elements 3 constituted as compression springs are able first and foremost to support the static load transfer usually caused by the weight force via the bearing.

A linear actuator 5 connected to a gear unit 4, an elastically deformable element 2 formed as an elastomer molded body and connected via an intermediate plate 111 to gear unit 4 and also a decoupling unit 1, in the form of a fluid damper, are provided in a serial arrangement between the two support elements 3 represented in the example of embodiment according to FIG. 3. The ensemble comprising linear actuator 5, gear unit 4, elastically deformable element 2 and decoupling unit 1 represents a second force path II acting between interface 7 in the form of mounting plate 102 and lower mounting plate 103 resting on support unit 6. The force path is orientated parallel to the first force path defined in each case by support elements 3. On account of decoupling unit 1 with a damping effect, only dynamic components of the load transfer can be transmitted along the second force path, at frequencies above a lower limit frequency G, as described above by reference to FIGS. 2*a* and *b*.

Decoupling unit 1 with a damping effect is a fluid damper, which comprises a housing filled with a hydraulic fluid, inside of which a displacement body which is stamp-like, is mounted to be displaceable bi-directionally along the force flow of second force path II and, in the case represented, is fixedly connected at one end to interface 7 constituted as mounting plate 102.

In order to avoid the components disposed along second force path II entering into an interaction with support elements 3, the components are disposed separately with respect to support elements 3 and surrounded solely by a compressible medium, which is preferably air.

In a further embodiment, the damping effect of decoupling element 1 can be influenced in a targeted manner by using an electrorheological or magnetorheological hydraulic fluid. Electrorheological or magnetorheological fluids change their rheological properties, that is viscosity, as a function of an external electrical or magnetic field, in order in this way to exert an active influence on the force transmission behavior of the displacement body which is stamp-like and is disposed in a linearly mobile manner inside the fluid. Arrangements known in the art are provided to generate a suitable electric or magnetic field.

When use is made of such fluids as a hydraulic fluid, moreover, there is the possibility of protecting linear actuator 5 and gear unit 4 against overload. For this purpose, an additional force sensor S needs to be provided in the bearing. The force sensor S determines the force acting on linear actuator 5. When preset threshold values are exceeded, that is, for the force acting on linear actuator 5 or its deformation, the force transmission is correspondingly reduced through the decoupling element with the aid of signal processing A/S, for example by influencing the viscosity of the hydraulic fluid.

Figure 4:
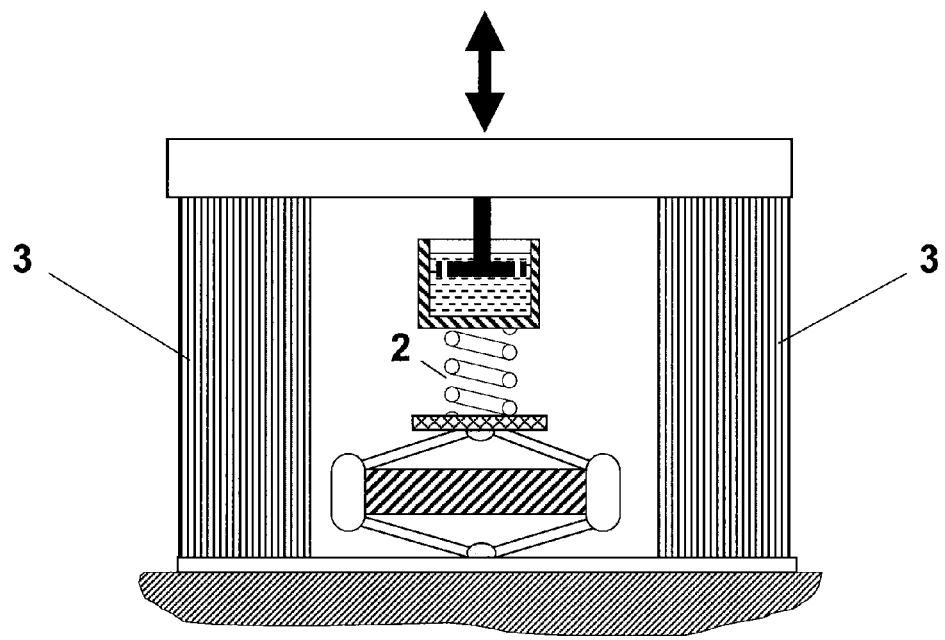
FIG. 4 shows a second variant of embodiment of an active bearing according to the invention.

FIG. 4 represents an alternative embodiment for creating an active bearing, which in principle is of the same design as the embodiment represented in FIG. 3, but unlike FIG. 3 support elements 3 are constituted as elastomer molded bodies and an elastically deformable element 2 acting as a spring element. The remaining components are unchanged compared with the example embodiment according to FIG. 3. Many combinations are possible with respect to the embodiment of support elements 3 and the at least one elastically deformable element 2 from the embodiments specifically indicated in FIGS. 3 and 4 are also possible.

Figure 5:
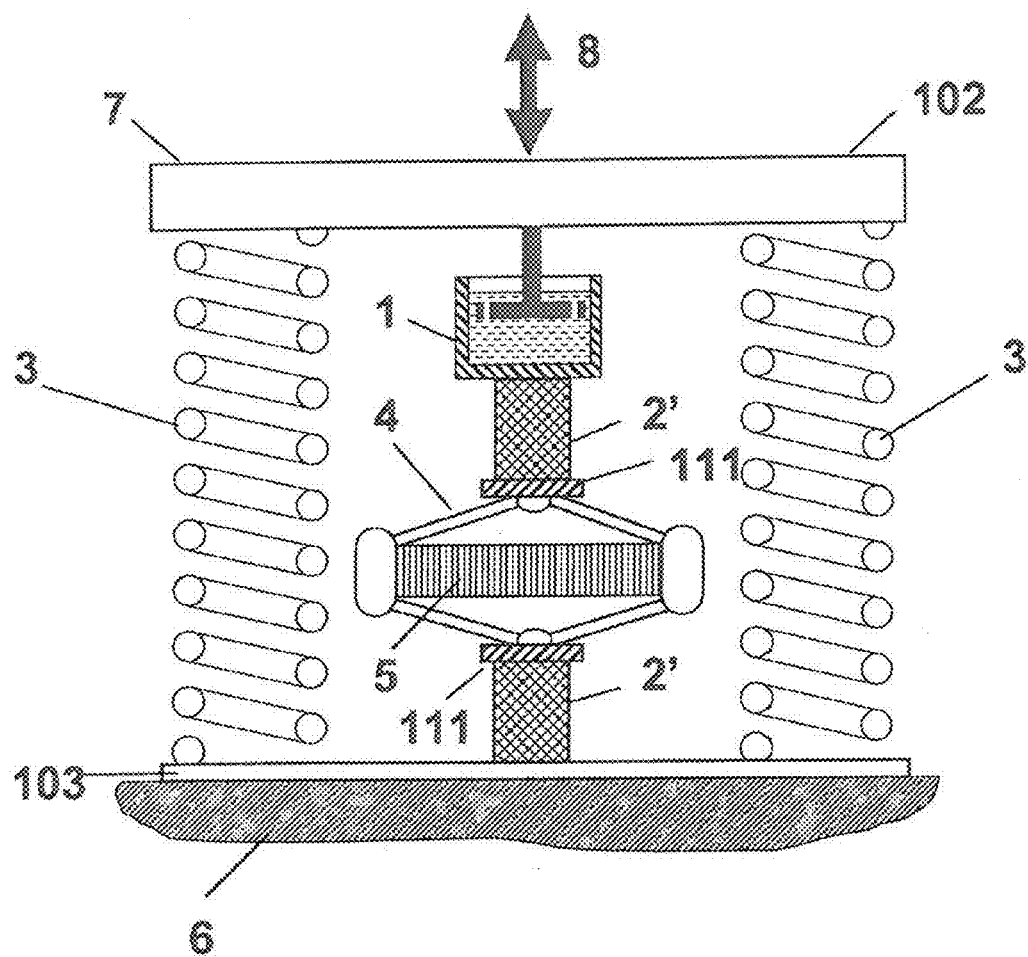
FIG. 5 shows a third variant of embodiment of an active bearing constituted according to the invention.

FIG. 5 illustrates an active bearing, linear actuator 5 and gear unit 4 which are respectively disposed between two elastically deformable elements 2' and 2' disposed separately along second force path II. Moreover, the further embodiment of the active bearing is comparable with the examples of embodiment according to FIGS. 3 and 4, so that an explanation of the components provided with the already introduced reference numbers will not be made. An influence on the resonance frequency of linear actuator 5 in combination with gear unit 4 can be exerted by the division, represented in FIG. 5, of an elastically deformable element 2 into two separate, elastically deformable elements 2' and 2'. This is advantageous or even necessary especially in those cases in which the resonance frequency from the combination of linear actuator 5 and gear unit 4 lies in or near to the respective operating range of the bearing itself. In this case, a displacement of the resonance frequency which differs markedly from the operating range of the active bearing can be carried out by a suitable selection respectively of the stiffness of the two elastically deformable elements 2' and 2'.

Through the division of the elastically deformable element into two parts 2' and 2' represented in FIG. 5, which are disposed on gear unit 4 in particular on both sides via, in each case, a contact plate 111, it is possible, with a unit comprising gear unit 4 and linear actuator 5 constructed symmetrically with the longitudinal extension and with an identical embodiment of the two parts 2' and 2', to achieve a situation such that linear actuator 5 does not need to move its inherent linear actuator mass in operation, that is the linear actuator 5 remains at rest relative to the force flow along the second force path. In this way, the resonance frequency of gear unit 4 connected to linear actuator 5 can be shifted into a higher frequency range. Furthermore, the combination of linear actuator 5 and gear unit 4 is protected against external mechanical impact by the two-sided elastic bearing and an electrical insulation from the surroundings is created in the case of electrically non-conductive elastomer material for the formation of the two elastically deformable elements 2' and 2'.

Figure 6:
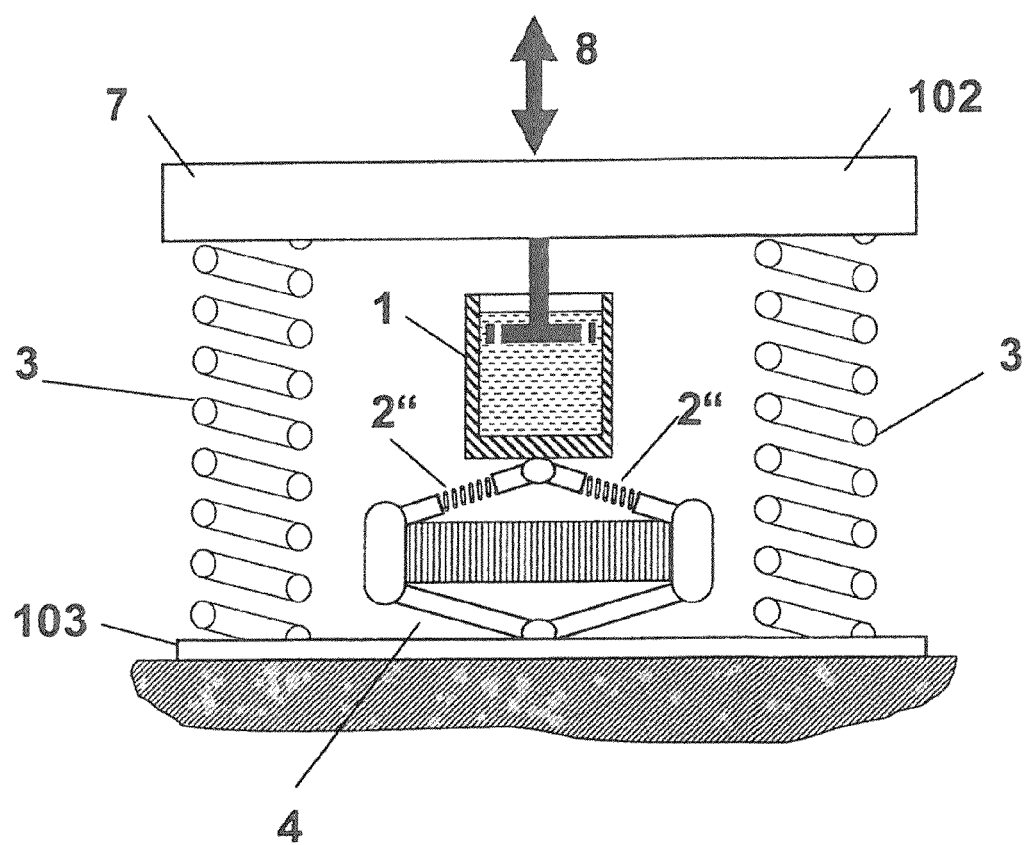
FIG. 6 shows an example of embodiment of an active bearing with a gear unit which is elastically deformable.

FIG. 6 illustrates a further example of embodiment for creating an active bearing constituted according to the invention, which has a very compact design, especially since elastically deformable element 2 is combined integratively with gear unit 4 along second force path II. As in the case of gear units 4 described above, it involves here a mechanical path transmission mechanism, which comprises at least two lever mechanisms wherein one lever mechanism is provided along the second force path above linear actuator 5 and one lever mechanism is provided below linear actuator 5. In the case as illustrated, the upper lever mechanism provides in each case, along the two lever arms connected together in a swivelling manner by a linkage unit, an elastically deformable element 2" and 2", for example in the form of a spiral spring, for significantly adjusting the stiffness of at least the upper lever mechanism. Alternative measures can of course also be taken to introduce into the gear unit additional elasticity effective along the second force path, so that the gear unit is softer than is required to only perform the linkage function, using the lever arms which, by a material selection or shaping, are made softer than is required to perform the force transmission function.

The example of embodiment illustrated in FIG. 6 illustrates that the function of the elastically deformable element can also be achieved by a suitable embodiment of gear unit 4.

It is also possible for the support elements 3 to be in FIGS. 3, 5 and 6 suspension springs or FIG. 4 molded bodies made of elastomer material or alternatively, to be at least one passive hydraulic bearing which is known. What is important is that the static load transfer between interface 7 and support unit 6 is taken up via a support element 3.

LIST OF REFERENCE NUMBERS

1 decoupling unit
2 elastically deformable element
2' two elastically deformable elements
2" spiral spring
3 support element
4 gear unit, mechanical path transmission mechanism
5 linear actuator
6 support unit
7 interface
8 load
102 mounting plate
103 lower mounting plate
111 intermediate plate

The invention claimed is:

1. An active bearing for controlled vibration transmission comprising:
   a) an interface including static and dynamic load transfer parts to be attached to a load through which the static and dynamic load parts are transferred;
   b) at least one support element in an operative connection with the interface and a support unit, the at least one support element supporting at least the transfer of the static load part along a first force path extending from the support unit to the interface;
   c) at least one linear actuator supported indirectly or directly on the support unit;

d) a gear unit for transmission of an actuating path change originating from the at least one linear actuator, the gear unit being in an operative connection with the at least one linear actuator;
e) at least one decoupling unit, for decoupling the static load transfer part and for transmitting the dynamic load transfer part so that the gear unit is indirectly or directly in an operative connection with the interface; and wherein the at least one linear actuator, the gear unit and the at least one decoupling unit are disposed serially with respect to one another and form a second force path extending from the support unit to the interface for the dynamic load transfer, and the at least one linear actuator, the gear unit, the at least one decoupling unit, and at least one elastically deformable element is disposed along the second force path, with the support element and the at least one elastically deformable element being separated from one another;

the gear unit is a mechanical path transmission mechanism comprising at least one lever mechanism; and the components of the active bearing contained along the first and second force paths are separated along the first and second force paths with a gaseous compressible medium to isolate the first and second force paths.

2. The active bearing according to claim 1, wherein:
the decoupling unit has a dynamic stiffness dependent on a frequency of the dynamic load transfer part.

3. The active bearing according to claim 2, wherein:
dynamic stiffness of the at least one decoupling unit increases with increasing frequency in a frequency range.

4. The active bearing according to claim 3, wherein:
the dynamic stiffness of the at least one elastically deformable element is substantially independent of the frequency or the at least one elastically deformable element has a dynamic stiffness which is at least smaller than a dynamic stiffness of the decoupling unit; and
stiffness of the elastically deformable element limits a maximum dynamic stiffness of the at least one linear actuator, the gear unit, the at least one decoupling unit and the at least one deformable unit in series along the second force path.

5. The active bearing according to claim 2, wherein:
the dynamic stiffness of the at least one elastically deformable element is substantially independent of the frequency or the at least one elastically deformable element has a dynamic stiffness which is at least smaller than a dynamic stiffness of the decoupling unit; and
stiffness of the elastically deformable element limits a maximum dynamic stiffness of the at least one linear actuator, the gear unit, the at least one decoupling unit and the at least one deformable unit in series along the second force path.

6. The active bearing according to claim 5, wherein:
the at least one elastically deformable element comprises at least one spring element, at least one molded body made from an elastomer material or a combination of at least one spring element or at least one molded body made from an elastomer material.

7. The active bearing according to claim 5, wherein:
the decoupling unit comprises a viscous fluid damper, at least one damping material, or a combination of a viscous fluid damper and damping material.

8. The active bearing according to claim 5, wherein:
the decoupling unit includes a variably adjustable damping capacity.

9. The active bearing according to claim 8, wherein:
at least one load-detecting sensor is integrated along the second force path, which is connected to an evaluation and control unit and based on a target function generates a control signal for controlling the adjustable damping capacity.

10. The active bearing according to claim 5, comprising:
a control unit for picking up a signal representing disturbing vibrations detectable with at least one signal transmitter coupled indirectly or directly to the load and, after picking up the signal, the control unit generates control signals for controlling the at least one linear actuator to provide a reduction in vibrations between the load and the support unit.

11. The active bearing according to claim 2, wherein:
the at least one elastically deformable element comprises at least one spring element, at least one molded body made from an elastomer material or a combination of at least one spring element or at least one molded body made from an elastomer material.

12. The active bearing according to claim 2, wherein:
the decoupling unit comprises a viscous fluid damper, at least one damping material, or a combination of a viscous fluid damper and damping material.

13. The active bearing according to claim 2, wherein:
the decoupling unit includes a variably adjustable damping capacity.

14. The active bearing according to claim 13, wherein:
at least one load-detecting sensor is integrated along the second force path, which is connected to an evaluation and control unit and based on a target function generates a control signal for controlling the adjustable damping capacity.

15. The active bearing according to claim 2, comprising:
a control unit for picking up a signal representing disturbing vibrations detectable with at least one signal transmitter coupled indirectly or directly to the load and, after picking up the signal, the control unit generates control signals for controlling the at least one linear actuator to provide a reduction in vibrations between the load and the support unit.

16. The active bearing according to claim 1, wherein:
the at least one elastically deformable element comprises at least one spring element, at least one molded body made from an elastomer material or a combination of at least one spring element or at least one molded body made from an elastomer material.

17. The active bearing according to claim 16, wherein:
the decoupling unit has a greater damping capacity than a damping capacity attributable to the at least one elastically deformable element.

18. The active bearing according to claim 17, wherein:
the decoupling unit comprises a viscous fluid damper, at least one damping material, or a combination of a viscous fluid damper and damping material.

19. The active bearing according to claim 17, wherein:
the decoupling unit includes a variably adjustable damping capacity.

20. The active bearing according to claim 19, wherein:
at least one load-detecting sensor is integrated along the second force path, which is connected to an evaluation and control unit and based on a target function generates a control signal for controlling the adjustable damping capacity.

21. The active bearing according to claim 17, comprising:
a control unit for picking up a signal representing disturbing vibrations detectable with at least one signal transmitter coupled indirectly or directly to the load and, after picking up the signal, the control unit generates control signals for controlling the at least one linear actuator to provide a reduction in vibrations between the load and the support unit.

22. The active bearing according to claim 16, wherein:
the decoupling unit comprises a viscous fluid damper, at least one damping material, or a combination of a viscous fluid damper and damping material.

23. The active bearing according to claim 16, wherein:
the decoupling unit includes a variably adjustable damping capacity.

24. The active bearing according to claim 23, wherein:
at least one load-detecting sensor is integrated along the second force path, which is connected to an evaluation and control unit and based on a target function generates a control signal for controlling the adjustable damping capacity.

25. The active bearing according to claim 16, comprising:
a control unit for picking up a signal representing disturbing vibrations detectable with at least one signal transmitter coupled indirectly or directly to the load and, after picking up the signal, the control unit generates control signals for controlling the at least one linear actuator to provide a reduction in vibrations between the load and the support unit.

26. The active bearing according to claim 1, wherein:
the decoupling unit comprises a viscous fluid damper, at least one damping material, or a combination of a viscous fluid damper and damping material.

27. The active bearing according to claim 26, wherein:
the decoupling unit includes a variably adjustable damping capacity.

28. The active bearing according to claim 27, wherein:
at least one load-detecting sensor is integrated along the second force path, which is connected to an evaluation and control unit and based on a target function generates a control signal for controlling the adjustable damping capacity.

29. The active bearing according to claim 1, wherein:
the decoupling unit includes a variably adjustable damping capacity.

30. The active bearing according to claim 29, wherein:
at least one load-detecting sensor is integrated along the second force path, which is connected to an evaluation and control unit and based on a target function generates a control signal for controlling the adjustable damping capacity.

31. The active bearing according to claim 30, comprising:
a control unit for picking up a signal representing disturbing vibrations detectable with at least one signal transmitter coupled indirectly or directly to the load and, after picking up the signal, the control unit generates control signals for controlling the at least one linear actuator to provide a reduction in vibrations between the load and the support unit.

32. The active bearing according to claim 29, comprising:
a control unit for picking up a signal representing disturbing vibrations detectable with at least one signal transmitter coupled indirectly or directly to the load and, after picking up the signal, the control unit generates control signals for controlling the at least one linear actuator to provide a reduction in vibrations between the load and the support unit.

33. The active bearing according to claim 1, comprising:
a control unit for picking up a signal representing disturbing vibrations detectable with at least one signal transmitter coupled indirectly or directly to the load and, after picking up the signal, the control unit generates control signals for controlling the at least one linear actuator to provide a reduction in vibrations between the load and the support unit.

34. The active bearing according to claim 1, wherein:
the decoupling unit and the support element are spatially separated from one another and a compressible medium is disposed between the decoupling unit and the support element.

35. The active bearing according to claim 1, wherein:
the at least one linear actuator is a solid-state actuator having a longitudinal extension disposed at right angles to the second force path and along which longitudinal extension the actuating path change takes place;
the gear unit comprises a lever mechanism disposed symmetrically with longitudinal extension of the linear actuator being in an operative connection therewith, the lever mechanism converting actuating path changes of the at least one linear actuator into path changes orientated along the second force path and acting in opposite spatial directions; and
the gear unit is disposed along the second force path between two elastic components of the at least one elastically deformable element.

36. The active bearing according to claim 35, wherein:
the lever mechanism is disposed so that path changes orientated along the second force path acting in opposite spatial directions are of equal magnitude.

37. The active bearing according to claim 36, wherein:
the gear unit comprises at least one means for transmissions in the second path which is elastically deformable.

38. The active bearing of claim 1, wherein:
vibrations are reduced with respect to a supporting structure supporting at least one engine unit.

39. The active bearing according to claim 38, wherein:
the supporting structure comprises a motor vehicle bodywork, rail-bound vehicle bodywork, a ship's hull or an aircraft structure.

40. The active bearing according to claim 1, wherein:
at least vibration reduction of at least one vibration-sensitive component or structure is provided with respect to a vibrating carrying structure.

41. The active bearing according to claim 1, wherein:
a vibratory state of the load is influenced by the active bearing.

* * * * *